United States Patent [19]

Nagai et al.

[11] Patent Number: 5,738,775
[45] Date of Patent: Apr. 14, 1998

[54] ELECTRICALLY REGENERABLE DESALTING APPARATUS

[75] Inventors: Hiroshi Nagai; Syu Nakanishi; Kunio Fujiwara, all of Kanagawa-ken; Takanobu Sugo, Gunma-ken, all of Japan

[73] Assignees: Ebara Corporation; Japan Atomic Energy Research Institute, both of Tokyo, Japan

[21] Appl. No.: 870,993

[22] Filed: Jun. 6, 1997

Related U.S. Application Data

[62] Division of Ser. No. 724,797, Oct. 2, 1996, abandoned.

[30] Foreign Application Priority Data

Oct. 1, 1995 [JP] Japan .................... 7-257403

[51] Int. Cl.$^6$ .................... B01D 61/44; B01D 61/48
[52] U.S. Cl. .................... 204/632; 204/633; 204/634; 204/647
[58] Field of Search .................... 204/632, 633, 204/634, 647

[56] References Cited

U.S. PATENT DOCUMENTS 5,308,467  5/1994  Sugo et al. ............... 204/301
5,425,866  6/1995  Sugo et al. ............... 204/301
5,512,173  4/1996  Uchino et al. ............. 204/632

FOREIGN PATENT DOCUMENTS 52-62178   5/1977   Japan .
1-307410  12/1989   Japan .
5-64726    3/1993   Japan .

OTHER PUBLICATIONS

Nagai, et al, "Continous Pure Water Making System Using Graft Polymerized Fabric"; *Ebara Engineering Review*, 164:43–48 (1994) No Month.

*Primary Examiner*—Arun S. Phasge
*Attorney, Agent, or Firm*—Browdy and Neimark

[57] ABSTRACT

Electrically regenerable desalting apparatus having the desalting compartment packed with ion exchangers produced by utilizing radiation-initiated graft polymerization, in which said ion exchangers are nonwoven fabrics in the form of a fiber assembly and a cation exchanger and an anion exchanger are disposed in a face-to-face relationship, with a porous material being interposed between the two ion exchangers. Having the ability to reject ions from liquids, the apparatus is particularly suited to the production of pure water in the electrical power generating industries (including the nuclear industry), electronic industry and the pharmaceuticals manufacturing industry, as well as to the desalting of thick fluids encountered in food and chemical manufacturing processes.

20 Claims, 3 Drawing Sheets

MIXED BED

FEED WATER

ELECTRICALLY REGENERABLE DESALTING APPARATUS

This application is a continuation of application Ser. No. 08/724,797, filed Oct. 2, 1996 now abandoned.

BACKGROUND OF THE INVENTION

This invention relates to an apparatus for rejecting ions from liquids which is applicable to the production of pure water in the electrical power generating industries (including the nuclear industry), electronic industry and the pharmaceuticals manufacturing industry, as well as to the desalting of thick fluids encountered in food and chemical manufacturing processes.

Methods of rejecting ions from liquids are roughly classified as reverse osmosis, electrodialysis and ion exchange. For desalting liquids of high salt concentration like seawater, reverse osmosis is held to be advantageous, whereas electrodialysis is suitable for liquids of lower salt concentrations and liquids of an even smaller salt concentration can effectively be treated by the ion exchange technology.

In the prior art method of electrodialysis, potential difference is utilized as a driving force to cause ion migration, so if the ion concentration decrease, the current efficiency deteriorates and the concentration of salts in water cannot be made lower than several hundred ppm. To solve this problem, a method was proposed to enhance the current efficiency by packing the desalting compartment with an ion exchanger (U.S. Pat. No. 2,815,320 to Kollsman). Although this proposal was made more than 30 years ago, it was never commercialized because it involved many problems such as scale deposition on the membrane and ion-exchange resin.

However, with the recent changes in the circumstances such as improvements in the performance of membranes, advances in the method of pretreatments and the demand of user industries for desalting apparatus that do not require complicated regeneration facilities, as well as the social concern for resources and energy saving, researchers took a new look at the electrically regenerable desalting apparatus. A revamped early model of electrically regenerable desalting apparatus was proposed (U.S. Pat. No. 4,632,745 to Millipore Corporation) and has been marketed.

The current model of electrically regenerable desalting apparatus comprises a desalting compartment packed with a mixture of cation- and anion-exchange resins. The ion-exchange resins are in the form of a true sphere ranging in diameter from 0.4 to 0.6 mm. The spheres are uniformly packed in the space defined by two ion-exchange membranes and a plurality of layers comprising such cells are stacked to form an assembly that resembles a filter press. However, this process requires utmost care in fabrication and is quite cumbersome. For example, if the ion-exchange resins or broken particles thereof leak from the end portions of the frame, the desalted water may have a lower purity. In addition, the expected great increase in differential pressure makes it impossible to permit an increased flow. In some models, a special design is incorporated to enable the backwashing of ion-exchange resin layers if they are contaminated or subjected to compaction but dispersing cation- and anion-exchange resins uniformly is not as easy as one would imagine. The most important reason for packing ion-exchange resins is to facilitate ion migration, so if cation- and anion-exchange resins are separated from each other or if they are not uniformly distributed, less passageways will exist for ion migration and the desired purity may not be obtainable.

Because of these problems, the electrically regenerable desalting apparatus is generally held to be suitable for limited use such as in laboratories where small volumes of water need be treated to satisfy less rigorous quality requirements.

Under the circumstances, there was proposed an electrically regenerable desalting apparatus that was packed with ion exchangers that were produced by radiation-initiated graft polymerization (Japanese Patent Public Disclosure No. 64726/1993). According to the proposal, ion exchangers, particularly ion-exchange fibers, produced by radiation-initiated graft polymerization were packed into the desalting compartment and in this way, the various problems that had occurred as the result of packing of ion-exchange resins were solved, leading to the fabrication of an electrically regenerable desalting apparatus that consumed less power and which yet was capable of maintaining consistent quality of water for an extended period of time.

However, when ion-exchange fibers or ion-exchange nonwoven fabrics which were an assembly of such ion-exchange fibers were packed into a desalting compartment according to the stated method, the resulting setup was found to cause the following problems in a water flow test. When the packing of the ion-exchange fibers (or nonwoven fabrics) was small, the fibers deformed under compaction to cause channeling of the feed water, eventually leading to the deteriorated quality of the treated water. When the packing of the ion-exchange fibers (or nonwoven fabrics) was great, the pressure loss increased so much as to cause occasional water leakage. In order to ensure that the feed water would make many contacts with both the cation- and anion-exchange fibers, the ion-exchange fibers (or nonwoven fabrics) used in the proposal under consideration were such that the two types of ion-exchange fibers were blended together or bundles of the two types were interwoven as warp and weft or the two types of ion-exchange groups were incorporated in a checkerboard pattern into a nonwoven fabric. Alternatively, the interior of the desalting compartment which was to be packed with both types of ion-exchange fibers (or nonwoven fabrics) was divided into a multiple of small compartments, part of which were packed with cation-exchange fibers and the others packed with anion-exchange fibers, such that the feed water was flowed successively through these small compartments. Producing such ion-exchange fibers or dividing the desalting compartment into a multiple of smaller area was possible on a laboratory scale but many problems were found to exist from the viewpoint of mass production and the fabrication of actual equipment.

It was in order to solve these problems that Japanese Patent Application No. 271207/1993 was proposed. According to this proposal, a cation-exchange and an anion-exchange nonwoven fabric spaced apart by a plastic net were packed into a desalting compartment. As a result, it was not necessarily required for the feed water to be passed through the ion-exchange fiber layers and various advantages resulted such as a smaller pressure loss, ease in the manufacture of ion-exchange fibers and simplicity in apparatus design.

However, continued experiments based on the above proposal have revealed that the results are not always satisfactory and problems such as deterioration in the quality of treated water and a voltage increase sometimes occurred. The present inventors conducted intensive studies in order to identify the causes of these troubles and accomplished the present invention.

SUMMARY OF THE INVENTION

An object, therefore, of the present invention is to provide an electrically regenerable desalting apparatus that solves the aforementioned problems of the prior art associated with the packing of ion-exchange fibers, that can maintain consistent water quality, low pressure loss and satisfactory electrical characteristics for an extended period of time, that is capable of handling from small to large volumes of water and which requires simple maintenance and management procedures.

This object of the invention can be attained by an electrically regenerable desalting apparatus having ion exchanger packed in a desalting compartment, in which said ion exchange are nonwoven fabrics in the form of a fiber assembly and in which a cation exchanger and an anion exchanger are disposed in a face-to-face relationship, with a porous material being interposed between the two ion exchangers.

The ion-exchange nonwoven fabrics for use in the electrically regenerable desalting apparatus of the invention may each comprise an assembly of core-sheath composite fibers, with the sheath component being a polyolefinic high polymer and the core component being any of the high polymers other than the one used as the sheath component. Individual core-sheath fibers may have a cross section consisting of concentric circles. The nonwoven fabrics may be produced by thermal fusion. Ion-exchange groups may be introduced primarily into the sheath portion of each core-sheath composite fiber by utilizing radiation-induced graft polymerization.

For performing graft polymerization on the substrate nonwoven fabric which is to be used in the electrically regenerable desalting apparatus of the invention, a polymerizable monomer having said ion-exchange groups or one that can be converted to the ion-exchange groups is grafted onto said substrate nonwoven fabric. Such ion-exchange groups have at least a sulfonic acid group as a cation-exchange group and at least a quaternary ammonium group as an anion-exchange group; these ion-exchange groups have an ion-exchange capacity in the range from 0.5 meq/g to 3 meq/g in terms of a capacity for decomposing neutral salts.

The electrically regenerable desalting apparatus of the invention preferably has the following characteristics: the desalting compartment has a thickness of 3–4 mm; the substrate for the ion-exchange nonwoven fabrics to be packed into the desalting compartment has a thickness of 0.1–1.0 mm, an areal density of 10–100 g/m$^2$, a porosity of 50–98% and a fiber diameter of 10–70 μm; the porous material interposed between the cation- and anion-exchange nonwoven fabrics is a synthetic resin net having a thickness of 0.3–1.5 mm.

DETAILED DESCRIPTION OF THE INVENTION

The present invention will now be described with reference to the accompanying drawings.

Figure 1:
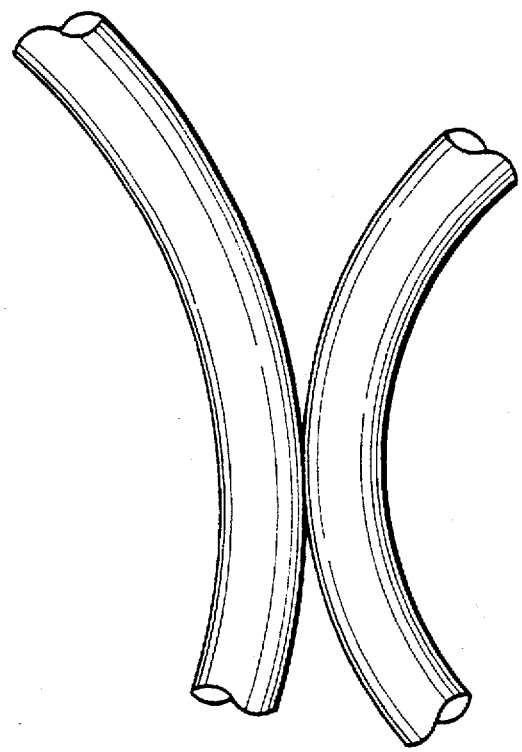
FIG. 1 shows how fibers in a nonwoven fabric produced by a process other than thermal fusion make point contact.
Figure 2:
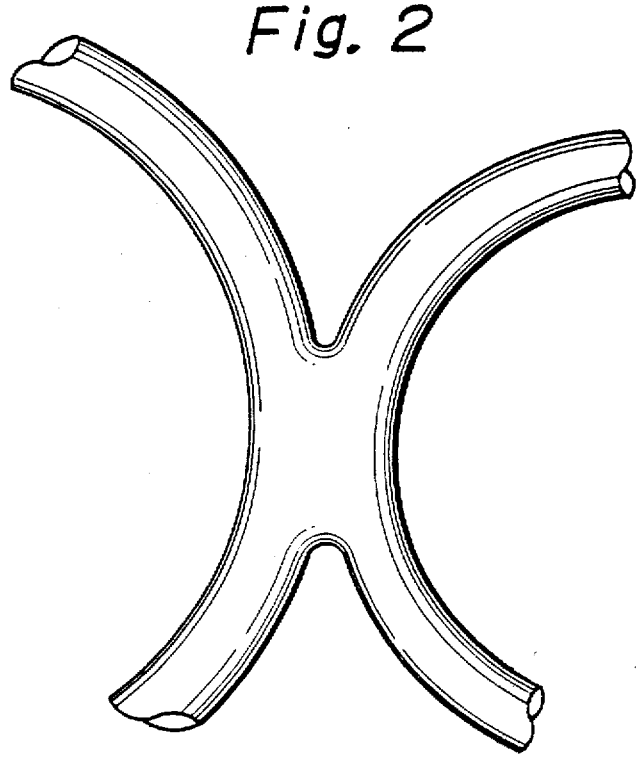
FIG. 2 shows how fibers in a nonwoven fabric produced by thermal fusion make areal contact.

Nonwoven fabrics can be produced by various methods including needle punching and spun bonding. For the specific purposes of the present invention, nonwoven fabrics produced by thermal fusion using core-sheath composite fibers are preferred. In the case of nonwoven fabrics produced by methods other than thermal fusion, individual fibers make point contact as shown in FIG. 1 but if thermal fusion is employed, a product is obtained in which two fibers contact each other over an area as shown in FIG. 2. The primary function of ion exchangers used in an electrically regenerable desalting apparatus is as a medium for causing migration of adsorbed ions, so the nonwoven fabric produced by thermal fusion is preferred in view of the ease with which ions migrate from one fiber to another. As a further advantage, individual fibers are securely fused to one another in the area of contact, so in spite of its small thickness, the nonwoven fabric produced by thermal fusion has a sufficient strength and permits less generation of fiber particles. It should particularly be noted that an ion exchanger produced by radiation-initiated graft polymerization does not have a crosslinked structure in graft chains, so it has an excellent capability for trapping ions and fine particles by the graft chains on the fiber surface. This is a critical factor when the electrically regenerable desalting apparatus of the present invention is to be applied to the production of pure or ultrapure water.

If thermal fusion is applied to single-component fibers rather than the core-sheath composite fiber, the fused portion will form a film, which is not preferred for the purposes of the invention.

The core-sheath composite fiber has a polyolefinic sheath component which is to be subjected to graft polymerization. Polyethylene is the most preferred polyolefin. If the substrate fiber is an eccentric core-sheath composite fiber, radiation-initiated graft polymerization and the subsequent reaction for introducing functional groups may occasionally cause core-sheath separation, leading to the generation of fine fiber particles. To avoid this problem, the core-sheath composite fiber to be used in the invention is preferably concentric. If the sheath portion is subjected to graft polymerization, a smaller area needs grafting compared to the case where a single-compact fiber is subjected to graft polymerization. Therefore, given the same graft ratio, ion-exchange groups can be concentrated more densely on the surface of the core-sheath fiber. This is a definite advantage since the rate of ion-exchange reaction increases with the concentration of ion-exchange groups on the surface of an ion exchanger. What is more, the long graft chains in the sheath portion are effective for trapping ions and fine particles.

As the graft polymerization proceeds, the strength of the sheath portion will deteriorate but the core portion remains sufficiently strong to maintain the overall strength of the nonwoven fabric. Preferred core-sheath combinations are polyethylene (sheath)/polypropylene (core) and polyethylene (sheath)/polyethylene terephthalate (core) and suitable core and sheath components may be determined as appropriate for various factors as radiation resistance, chemical resistance, reactivity in grafting and the conditions for the preparation of nonwoven fabrics.

If the core is made of polypropylene, radicals generated upon exposure to radiations will react with oxygen and oxidative deterioration will proceed as accompanied by cleavage of the backbone chain. If the core is made of polyethylene terephthalate, it exhibits high radiation resistance but, on the other hand, the ester group in the polyethylene terephthalate is sensitive to hydrolysis. Since the ion-exchange fibers to be packed in the electrically regenerable desalting apparatus of the invention are used as submerged in water, they have low oxygen concentration and, hence, will experience only limited oxidative deterioration. Therefore, the core material is preferably made of polypropylene (PP).

The polymerizable monomer to be grafted onto the substrate nonwoven fabric may be selected from among monomers having ion-exchange groups or those which can be converted to ion-exchange groups. If the ion-exchange groups are cation-exchange groups, at least sulfonic acid groups should be used; in the case of anion-exchange groups, at least quaternary ammonium groups should be used. This is because as in the production of pure water, the pH is in a neutral region in a neutral region and unless the ion-exchange groups are sulfonic acid and quaternary ammonium groups which can dissociate in this pH range, there occurs a voltage increase and the ion exchangers will not exhibit the desired performance. Needless to say, carboxyl groups which are weakly acidic cation-exchange groups or tertiary or lower amino groups which are weakly basic anion-exchange groups may also exist in addition to the sulfonic acid or quaternary ammonium group but even in this case the sulfonic acid and quaternary amino groups must each have an ion-exchange capacity in the range from 0.5 to 3 meq/g in terms of a capacity for decomposing neutral salts. The ion-exchange capacity varies with the graft ratio and the higher the graft ratio, the greater the ion-exchange capacity. Below 0.5 meq/g, there occurs a voltage increase and the treated water has only poor quality. Beyond 3 meq/g, the graft ratio must be increased to an extremely high level but then not only the strength of the nonwoven fabric is deteriorated but also its thickness is increased and no improvement in performance is achievable.

The desalting compartment of the electrically regenerable desalting apparatus according to the invention has preferably a thickness of 3–5 mm, with 3–4 mm being particularly preferred to satisfy the requirements for small current, high output flow, etc. as proposed in Japanese Patent Application No. 271207/1993. The present inventors conducted many experiments using setups having various types of ion-exchange nonwoven fabrics and synthetic resin nets packed in the desalting compartment. As a result, it has been found that in order to ensure satisfactory and consistent quality for the treated water, the substrate nonwoven fabric must have a thickness of 0.1–1.0 mm, an areal density of 10–100 g/m$^2$, a porosity of 50–98% and a fiber diameter of 10–70 μm, whereas the synthetic resin net must have a thickness in the range from 0.3 to 1.5 mm.

The reason for these requirements will now be described with reference to FIG. 3. Generally speaking, the quality of the water that is treated by an ion-exchange reaction depends on the number of contacts between a cation-exchange resin and an anion-exchange resin and the more contacts they have, the better the quality of the treated water. This is why the water treated with an ion-exchange apparatus of a mixed-bed type is satisfactory. In order to compose a mixed bed of ion-exchange fibers, a cation- and an anion-exchange fiber must be mixed to fabricate a nonwoven fabric, through which the feed water is to be passed. In this case, fibers other than the ion-exchange fibers must be added in order to ensure the desired strength for the nonwoven fabric but then the density of ion-exchange groups per unit area will become so small as to affect the voltage and the purity of the treated water. What is more, an increased pressure loss will occur since water is passed through the nonwoven fabric.

Whichever method is to be used to introduce ion-exchange groups, the cation-exchange nonwoven fabric is conveniently produced separately from the anion-exchange nonwoven fabric and this holds true with the case of employing the radiation-initiated graft polymerization method. However, if the separately produced nonwoven fabrics are reverted to fibers, which are mixed together and reprocessed into a nonwoven fabric, the advantage of using the nonwoven fabric produced by thermal fusion will be lost and problems may occur such as the generation of fiber particles. This gives rise to a challenge concerning how to improve the quality of treated water using the separately produced cation- and anion-exchange nonwoven fabrics. If substrate nonwoven fabrics having the physical characteristics specified above are used, the ion-exchange nonwoven fabrics produced by graft polymerization and subsequent introduction of ion-exchange groups will be 1.5–3 times as thick as the initial nonwoven fabrics, with the exact value depending on the graft ratio.

Figure 3A:
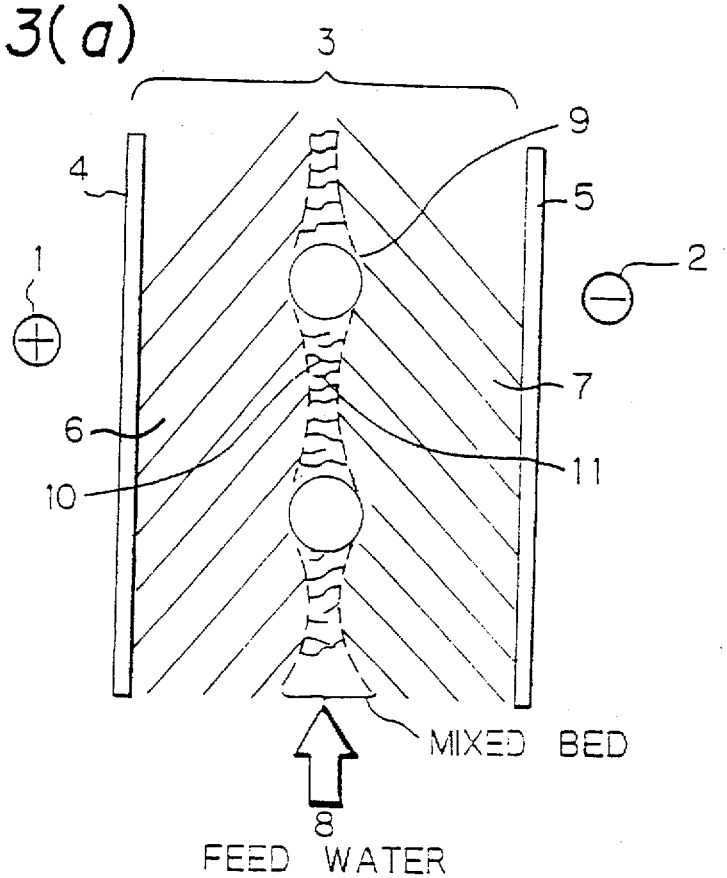
FIG. 3a is an enlarged cross section taken on line A—A of the desalting compartment of an electrically regenerable desalting apparatus which is packed with a cation- and an anion-exchange nonwoven fabric with a porous material being interposed.
Figure 3B:
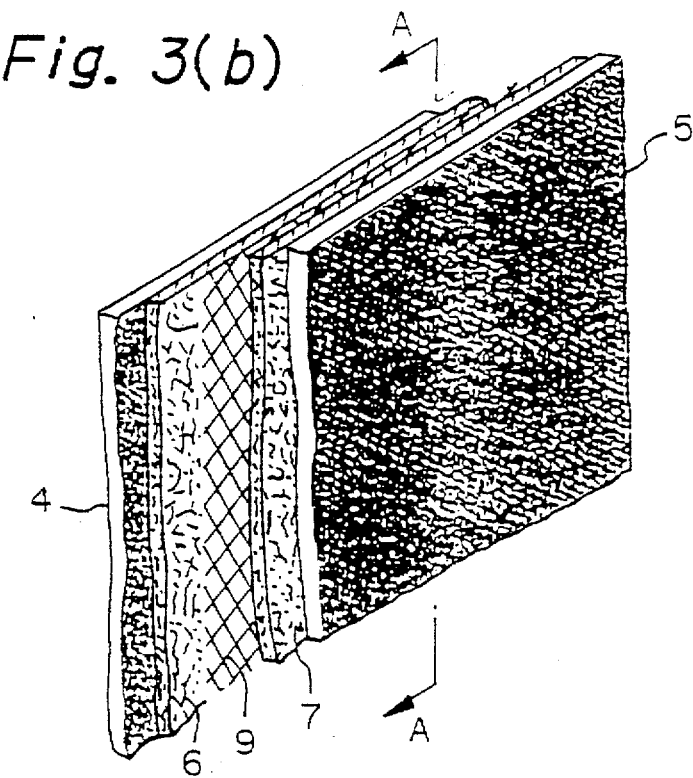
FIG. 3b is a perspective view of the desalting compartment.

Referring now to FIG. 3, assume that a cation-exchange nonwoven fabric 6 and an anion-exchange nonwoven fabric 7 are packed into a desalting compartment 3 defined by a cation-exchange membrane 4 and an anion-exchange membrane 5, with a net 9 being interposed between the two nonwoven fabrics. If the nonwoven fabrics are compressed together, fibers in the cation-exchange nonwoven fabric will protrude toward the net as indicated by 10 and fibers in the anion-exchange nonwoven fabric will also protrude toward the net as indicated by 11; as a result, a mixed bed is formed of the two types of ion-exchanger fibers and a passageway for the feed water is formed in the position of the mixed bed. The feed water is subjected to ion-exchange treatment by flowing through the mixed bed in which the net is provided as a porous material for producing turbulent flows. Since the feed water passes through the net-containing mixed bed, the ions in the feed water will have many contacts with both the cation- and anion-exchange fibers and the impurities in the feed water will be rejected efficiently as it passes through the mixed bed. In addition, the graft chains having non crosslinked structure that extend from the fiber surface permit more effective rejection of ions. In FIG. 3, numerals 1 and 2 refer to a negative and a positive electrode, respectively.

The present invention is also characterized in that the fibers in each of the ion-exchanger nonwoven fabrics have a core-sheath structure. Stated more specifically, the fibers having a core-sheath structure are reinforced by the core portion, so they are not only high in inherent strength but also less likely to bend under compression; in other words, the core-sheath fibers are tenacious and have good "body". Therefore, if a cation-exchange nonwoven fabric made of core-sheath fibers and an anion-exchange nonwoven fabric also made of core-sheath fibers are packed into a desalting compartment and compressed together, with a net being interposed, the excess fibers in each type of nonwoven fabric will protrude toward the net, forming a mixed bed of high cation- and anion-exchange capacities in the position where the protruding fibers exist. What is more, the net provided as a turbulence producing porous material between the cation- and anion-exchange nonwoven fabrics will cause the feed water to flow on the surfaces of these nonwoven fabrics, creating turbulences within the mixed bed. Hence, ion exchange occurs not only in the mixed bed but also on the surface of the ion-exchange nonwoven fabric on either side of the mixed bed, thereby accomplishing complete treatment of the feed water by ion exchange.

In contrast, a cation- and an anion-exchange nonwoven fabric that are made from single-component fibers having no core-sheath structure suffer the following disadvantages from the small strength and "body" of the fibers. If these nonwoven fabrics are compressed together, with a net being interposed, no fibers will protrude from either type of ion-exchange nonwoven fabric toward the net but they just bend and fail to form a mixed bed in the area where the net is provided. Thus, the nonwoven fabrics made of single-component fibers will not form a mixed bed even in the presence of the interposed net and the feed water is subjected to ion exchange which occurs on only the surface of either type of ion-exchange nonwoven fabric.

The thickness, areal density, porosity and fiber diameter of the substrate nonwoven fabric are closely interrelated and if the appropriate range of one parameter is determined, others are determined accordingly. In this connection, the following facts have been established. If the thickness of the substrate nonwoven fabric is less than 0.1 mm, it cannot be thicker than about 0.2 mm even after ion-exchange groups are introduced and this value is too small to serve the purposes of the invention. If the substrate thickness exceeds 1 mm, it becomes thicker than 2.5 mm after introduction of ion-exchange groups and this value is so great that it cannot be packed within the desalting compartment (which is typically 3–5 mm thick) without causing troubles such as an increased pressure loss and the difficulty in mounting ion-exchange membranes.

If the areal density of the substrate nonwoven fabric is less than 10 $g/m^2$, the increase in graft ratio does not contribute to providing a sufficient quantity of ion-exchange groups within the dealing compartment and there occurs a voltage increase, as well as deterioration in the quality of the treated water. Another problem with areal densities lower than 10 g/m is that the substrate nonwoven fabric has such a low strength that considerable difficulty will be encountered in producing ion-exchange nonwoven fabrics. If the areal density of the substrate nonwoven fabric exceeds 100 $g/m^2$, it becomes so thick upon introduction of ion-exchange groups that difficulty will be involved in packing it into the desalting compartment.

The porosity represents the void volume of the substrate nonwoven fabric. If it is less than 50%, what is obtained is a very dense fabric (which may well be described as a "film") and less fibers will project into the net. If the porosity of the substrate nonwoven fabric exceeds 98%, it is not only insufficient in strength but also small in ion-exchange capacity per unit volume. If the fiber diameter of the substrate nonwoven fabric is less than 10 μm or greater than 70 μm, it is difficult to manufacture nonwoven fabrics that comprise core-sheath fibers and which have the above-specified thickness, areal density and porosity.

Figure 4:
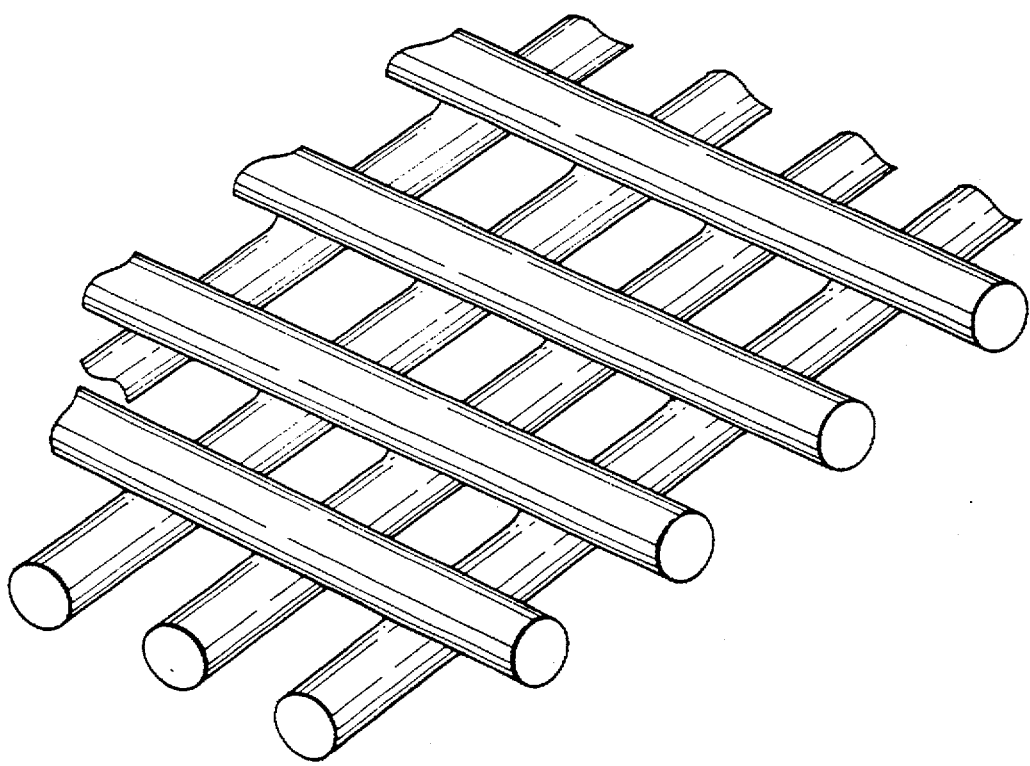
FIG. 4 shows an exemplary net used as the porous material.

A synthetic resin net is suitable as the porous material to be loaded between the cation- and anion-exchange nonwoven fabrics. The net should satisfy several requirements, which include: the ability to produce turbulent flows in the feed water so that it can have sufficient contact with the ion-exchange fibers protruding into the net; less generation of dissolved matter and particles; small pressure loss; and sufficiently intimate contact with the nonwoven fabrics to avoid their deformation and compaction. An example of the nets that satisfy these conditions is shown in FIG. 4 but that is not the sole shape of the net that can be used in the invention. The thickness of the net is suitably in the range of 0.3–1.5 mm, over which the feed water can be flowed in a large quantity without suffering a substantial pressure loss. A plurality of nets may be employed if the overall thickness lies within the stated range.

The cation- and anion-exchange nonwoven fabrics, as well as the net are fitted into the desalting compartment having a thickness of 3–5 mm. The sum of the thicknesses of the individual members will usually exceeds the thickness of the desalting compartment. The thicknesses of the individual members may be determined within the stated ranges in consideration of relevant factors such as the pressure loss, the quality required of the treated water and the voltage.

The following examples are provided for the purpose of further illustrating the present invention but are in no way to taken as limiting.

Example 1

Preparation of Ion-exchange Nonwoven Fabrics

Table 1 lists the specifications of the substrate nonwoven fabrics used in the preparation of ion-exchange nonwoven fabrics. The substrate nonwoven fabrics were prepared by thermal fusion of fibers consisting of a polypropylene core and a polyethylene sheath.

TABLE 1

| Specifications of Substrates for Ion-Exchange | |
|---|---|
| Core/sheath components | Core (polypropylene) / sheath (polyethylene) |
| Areal density | 60 $g/m^2$ |
| Thickness | 0.6 mm |
| Fiber diameter | 10–40 μm (average, 30 μm) |
| Method of preparing nonwoven fabric | Thermal fusion |
| Tensile strength | 2.5 kg/cm |
| Tensile elongation | 55–60% |
| Porosity | 88% |

One of the substrate nonwoven fabrics specified above was irradiated with 200 kGy of gamma-rays in a nitrogen atmosphere, immersed in a solution of glycidyl methacrylate (GMA) and subjected to graft polymerization at 40° C. for 8 h to achieve a graft ratio of 163%. Thereafter, the nonwoven fabric was immersed in an aqueous solution consisting of sodium sulfite, isopropyl alcohol and water in a ratio of 1:1:8 and subjected to sulfonation at 80° C. for 8 h. To determine the amount of sulfonic acid groups introduced into the nonwoven fabric, its ion-exchange capacity was measured; obviously, it was a strongly acidic cation-exchange nonwoven fabric having an ion-exchange capacity of 2.82 meq/g in terms of a capacity for decomposing neutral salts.

The other substrate nonwoven fabric was similarly irradiated with gamma-rays, immersed in a solution of chloromethylstyrene (CMS) and subjected to graft polymerization at 40° C. for 7 h to achieve a graft ratio of 148%. Thereafter, the nonwoven fabric was immersed in an aqueous solution of 10% trimethylamine and subjected to reaction at 50° C. for 3 h to introduce quaternary ammonium groups. The product was a strongly basic anion-exchange nonwoven fabric having an ion-exchange capacity of 2.49 meq/g in terms of a capacity for decomposing neutral salts.

Water flow test

An electrodialyzer having a desalting compartment measuring 300×200 m in a thickness of 4 mm was pecked with the above-prepared cation- and anion-exchange nonwoven fabrics to have the configuration shown in FIG. 3. The net had a thickness of 0.7 mm. The dialyzer was subjected to a single-cell water flow test under the conditions set forth in Table 2 below. The specific resistance of the treated water was stable at 16.0 MΩ.cm. The voltage was 10 volts and the pressure loss was less than 0.1 kg/cm$^2$.

Comparative Example 1

A substrate nonwoven fabric of the same specifications as set forth in Example 1 was subjected to graft polymerization with GMA under the same conditions as in Example 1, except that the reaction time was shortened to 15 min, whereby the GMA graft ratio was only 26%. By subsequent sulfonation for 1 h, a strongly acidic cation-exchange nonwoven fabric was prepared having an ion-exchange capacity of 0.47 meq/g in terms of a capacity for decomposing neutral salts.

Another substrate nonwoven fabric of the same specifications as set forth in Example 1 was subjected to graft polymerization with CMS under the same conditions as in Example 1, except that the reaction time was shortened to 10 min, whereby the CMS graft ratio was only 4%. By subsequent introduction of quaternary ammonium groups at 30° C. for 30 min using trimethylamine, a strongly basic anion-exchange nonwoven fabric was prepared having an ion-exchange capacity of 0.39 meq/g in terms of a capacity for decomposing neutral salts.

The two nonwoven fabrics thus prepared were packed into an electrodialyzer as shown in FIG. 3 (the thickness of the net was the same as in Example 1) and a water flow test was conducted as in Example 1. The voltage was as high as 40 volts and the quality of the treated water was poor as evidenced by a specific resistance of 1.3 MΩ.cm which was not only low but also unstable.

Comparative Example 2

Two substrate nonwoven fabrics each having the specifications set forth in Table 1 were subjected to graft polymerization with GMA and CMS, except that the reaction times were prolonged and that the subsequent reactions for introducing sulfonic acid and quaternary ammonium groups were also carried out for a longer time. Thus, a strongly acidic cation-exchange nonwoven fabric and a strongly basic anion-exchange nonwoven fabric were prepared which had ion-exchange capacities of 3.12 meq/g and 3.05 meq/g, respectively, in terms of a capacity for decomposing neutral salts.

The two ion-exchange nonwoven fabrics were packed into an electrodialyzer as shown in FIG. 3 (the thickness of the net was the same as in Example 1) but no water flow test could be performed with the experimental setup because the cation- and anion-exchange nonwoven fabrics each having a thickness of about 2.6 mm did not fit within the frame of the desalting compartment and, hence, could not be easily installed. When a frame 5 mm thick was substituted, the two ion-exchange nonwoven fabrics could be installed in the desalting compartment; however, when the setup was subjected to a water flow test, the pressure drop increased to 0.5 kg/cm$^2$.

Example 2

Preparation of ion-exchange nonwoven fabrics

A nonwoven substrate fabric having the specifications shown in Table 1 was irradiated with 200 kGy of gamma-rays, immersed in an aqueous mixed monomer solution consisting of sodium styrenesulfonate, acrylic acid and water in a ratio of 2:2:6 and subjected to graft polymerization at 40° C. for 7 h. Prepared in this way was a cation-exchange nonwoven fabric having a mixture of strongly acidic and weakly acidic ion-exchange groups to provide a total ion-exchange capacity of 4.8 meq/g and a capacity of 1.0 meq/g for decomposing neutral salts.

Another substrate nonwoven fabric having the specifications shown in Table 1 was similarly irradiated with gamma-rays, immersed in an aqueous mixed monomer solution consisting of vinylbenzyltrimethylammonium chloride, 2-hydroxyethyl methacrylate and water in a ratio of 2:1:7 and subjected to graft polymerization at 45° C. for 8 h. Prepared in this way was a strongly basic anion-exchange nonwoven fabric having an ion-exchange capacity of 1.15 meq/g in terms of a capacity for decomposing neutral salts.

The two ion-exchange nonwoven fabrics thus prepared were packed into an electrodialyzer as shown in FIG. 1 and a water flow test was conducted under the conditions set forth in Table 2. The specific resistance of the treated water was stable at 6 MΩ.cm and the voltage was 30 volts.

TABLE 2

| Conditions of Water Flow Test | |
|---|---|
| Specific resistance of inlet water | 0.1 MΩ.cm |
| Current | 30 mA/dm$^2$ |
| Feed water to concentrate ratio | 12/1 |

Comparative Example 3

Preparation of ion-exchange nonwoven fabrics

A substrate nonwoven fabric having the specifications shown in Table 1 was irradiated with 200 kGy of gamma-rays, immersed in an aqueous solution of 50% acrylic acid and subjected to graft polymerization at 45° C. for 8 h until a graft ratio of 54% was achieved. Prepared in this way was a weakly acidic cation-exchange nonwoven fabric having a total ion-exchange capacity of 4.7 meq/g.

Another substrate nonwoven fabric having the specifications shown in Table 1 was similarly irradiated, immersed in a solution consisting of a 1:2 mixture of GMA and methanol and subjected to graft polymerization at 40° C. for 8 h until a graft ratio of 149% was achieved. There after, the nonwoven fabric was immersed in an aqueous solution of 30% diethanolamine and subjected to reaction at 70° C. for 4 h, thereby yielding a weakly basic anion-exchange nonwoven fabric having a total ion-exchange capacity of 3.1 meq/g.

The two ion-exchange nonwoven fabrics were packed into the desalting compartment of an electrodialyzer of the same dimensions as specified in Example 1 (the thickness of the net was 0.7 mm) and a water flow test was conducted as in Example 1. The voltage was as high as 120 volts and the specific resistance of the treated water was as poor as 0.5 MΩ.cm.

From the results obtained in Examples 1 and 2, as well as Comparative Examples 1, 2 and 3, one can se that in order to produce ion-exchange nonwoven fabrics capable of attaining the objects of the invention, a strongly acidic cation-exchange group having a capability for decomposing neutral salts (as typified by a sulfonic acid groups), as well as a strongly basic anion-exchange group also having a capability for decomposing neutral salts (as typified by a quaternary ammonium group) are at least necessary in respective amount of 0.5–3 meq/g.

Example 3

Two substrate nonwoven fabrics each having the specifications set forth in Table 3 were irradiated with 100 kGy of electron beams, and subjected to graft polymerization, as well as reactions for introducing functional groups, whereby a strongly acidic cation-exchange nonwoven fabric and a strongly basic anion-exchange nonwoven fabric were prepared which had ion-exchange capacities of 2.2 meq/g and 2.4 meq/g, respectively, in terms of a capacity for decomposing neutral salts.

TABLE 3

Specifications of Substrates for Ion-Exchange Nonwoven Fabrics

| Core/sheath components | Core (polyester) / sheath (polyethylene) |
|---|---|
| Areal density | 50 g/m² |
| Thickness | 0.55 mm |
| Fiber diameter | 15–40 μm (average, 28 μm) |
| Method of preparing nonwoven fabric | Thermal fusion |
| Tensile strength | 2.8 kg/cm |
| Tensile elongation | 65% |
| Porosity | 91% |

The thus prepared ion-exchange nonwoven fabrics were packed into an electrodialyzer of the same size as shown in Example 1 (the thickness of the net was 0.5 mm) and a water flow test was conducted. The specific resistance of the treated water was stable at 16.9 MΩ.cm; in addition, the voltage and the pressure loss were satisfactorily small, the former being 15 volts and the latter being less than 0.1 kg/cm².

Comparative Examples 4–6

Substrate nonwoven fabrics each having the specifications set forth in Table 4 were irradiated with 200 kGy of Gamma-rays and subjected to graft polymerization as in Example 1 to yield a strongly acidic cation-exchange nonwoven fabric and a strongly basic anion-exchange nonwoven fabric.

TABLE 4

Specifications of Substrates for Ion-Exchange Nonwoven Fabrics

| Item | Comp. Ex. No. 4 | Comp. Ex. No. 5 | Comp. Ex. No. 6 | Comp. Ex. No. 7 |
|---|---|---|---|---|
| Core/sheath components | Core PP Sheath PE | Core PP Sheath PE | Core PP Sheath PE | Core PP Sheath PE |
| Thickness, mm | 0.08 | 1.2 | 0.5 | 0.8 |
| Areal density, g/m² | 30 | 60 | 8 | 110 |
| Porosity, % | 63 | 95 | 98.5 | 86 |
| Average fiber diameter, μm | 30 | 30 | 32 | 25 |
| Neutral salt decomposing capacity after reaction, meq/g | C 2.3 A 2.2 | C 2.6 A 2.4 | C 2.3 A 2.3 | C 2.6 A 2.5 |

Notes: C, strongly acidic cation-exchange nonwoven fabric
A, strongly basic anion-exchange nonwoven fabric
PP, polypropylene
PE, polyethylene The thus prepared nonwoven ion-exchange fabrics were subjected to a water flow test as in Example 1.

In Comparative Example 4, each ion-exchange nonwoven fabric had a thickness of only about 0.2 mm even after the introduction of ion-exchange groups and two nets (0.7 mm thick each) had to be interposed. The results of the water flow test were as follows: the specific resistance of the treated water was as low as 3.7 MΩ.cm whereas the voltage was as high as 93 volts.

In Comparative Example 5, each ion-exchange nonwoven fabric had a thickness of 2.7 mm after the introduction of ion-exchange groups and irrespective of whether a net having a thickness of 0.3 mm was used or a desalting compartment 5 mm thicken was employed, the combined thickness of the ion-exchange nonwoven fabrics substantially exceeded the thickness of the desalting compartment, thus presenting difficulty in fitting the ion-exchange nonwoven fabrics into the desalting compartment.

In Comparative Example 6, the thickness of each ion-exchange nonwoven fabric had no problem since it was about 1.3 mm upon introduction of functional groups. However, both ion-exchange nonwoven fabrics had insufficient strength and frequently ruptured when they were wetted with water. The results of the water flow test were as follows: the specific resistance of the treated water was as low as 5.1MΩ.cm whereas the voltage was as high as 54 volts.

In Comparative Example 7, each ion-exchange nonwoven fabric had a great thickness of 2.5 mm after the introduction of function of functional groups and it was necessary to use a net having a thickness of 0.3 mm. According to the water flow test, both the specific resistance of the treated water and the voltage were satisfactory at 1.71 MΩ.cm and 15 volts, respectively; however, the pressure loss was as high as 0.6 kg/cm². Even when the thickness of the desalting compartment was increased to 5 mm, the pressure loss was not lower than 0.3 kg/cm².

As described on the foregoing pages, the electrically regenerable desalting apparatus of the invention which is packed with ion-exchange nonwoven fabrics prepared by radiation-initiated graft polymerization not only permits the use of ion-exchange nonwoven fabrics prepared by a simple process in accordance with the invention; it also enables water to be treated with low pressure loss requiring less power while maintaining good and stable quality of the treated water for an extended period of time.

What is claimed is:

1. An electrically regenerable desalting apparatus having a cation- and an anion-exchange nonwoven fabric disposed in a face-to-face relationship within a desalting compartment as they are compressed together, with a porous material being interposed for creating turbulent flows, wherein (1) a substrate nonwoven fabric for both types of ion exchangers is composed of composite fibers having a core-sheath structure;

(2) a passageway for feed water in the form of an ion-exchanging mixed bed is formed between the cation-and anion-exchanger nonwoven fabrics which are disposed in a face-to-face relationship with said porous material being interposed; and (3) said feed water is treated by ion exchange as it makes contact primarily with fibers protruding from the surface of each ion-exchanger nonwoven fabric while flowing through said passageway.

2. An apparatus according to claim 1, wherein said substrate nonwoven fabric is an assembly of core-sheath composite fibers, with the sheath component being a polyolefinic high polymer and the core component being any of the high polymers other than the one used as the sheath component.

3. An apparatus according to claim 2, wherein said substrate nonwoven fabric is an assembly of core-sheath composite fibers, with the sheath component being polyolefin and the core component being polypropylene.

4. An apparatus according to claims 1 wherein said substrate nonwoven fabric is produced by thermal fusion.

5. An apparatus according to claims 4 wherein the core-sheath composite fibers used in said substrate nonwoven fabric have a concentric core-sheath arrangement.

6. An apparatus according to claim 5, wherein the core-sheath composite fibers used in said substrate nonwoven fabric have a concentric core-sheath arrangement.

7. An apparatus according claim 5, wherein ion-exchange groups are introduced into said substrate nonwoven fabric by utilizing radiation-initiated graft polymerization.

8. An apparatus according to claim 7, wherein said ion-exchange groups have at least a sulfonic acid group as a cation-exchange group and at least a quaternary ammonium salt as an anion-exchange group.

9. An apparatus according to claims 7, wherein said ion-exchange groups have an ion-exchange capacity in the range from 0.5 meq/g to 3 meq/g in terms of a capacity for decomposing neutral salts.

10. An apparatus according to 1, wherein the polymerizable monomer to be grafted onto said substrate nonwoven fabric either has ion-exchange groups or can be converted to ion-exchange groups.

11. An apparatus according to claim 10, wherein said ion-exchange groups have at least a sulfonic acid group as a cation-exchange group and at least a quaternary ammonium salt as an anion-exchange group.

12. An apparatus according to claim 11, wherein said ion-exchange groups have an ion-exchange capacity in range from 0.5 meq/g to 3 meq/g in terms of a capacity for decomposing neutral salts.

13. An apparatus according to claim 1, wherein the desalting compartment has a thickness of 3–5 mm.

14. An apparatus according to claims 1, wherein said substrate nonwoven fabric has a thickness of 0.1–1.0 mm.

15. An apparatus according to claims 1 wherein said substrate nonwoven fabric has an areal density of 10–100 g/m$^2$.

16. An apparatus according to claims 1, wherein said substrate nonwoven fabric has a porosity of 50–98%.

17. An apparatus according to claims 1, wherein the fibers composing said substrate nonwoven fabric have diameters of 10–70 μm.

18. An apparatus according to claim 1, wherein the porous material interposed between said two ion-exchange nonwoven fabrics is a synthetic resin net having a thickness of 0.3–1.5 mm.

19. An apparatus according to claim 1, wherein said desalting compartment has a thickness of 3–5 mm, said substrate nonwoven fabric has a thickness of 0.1–1.0 mm, an areal density of 10–100 g/m$^2$ and a porosity of 50–98%, the fibers composing said substrate nonwoven fabric have diameters of 10–70 μm, and the porous material interposed between said two ion-exchanger nonwoven fabrics is a synthetic resin net having a thickness of 0.3–1.5 mm, whereby fibers in each of said two ion-exchangers nonwoven fabrics are allowed to protrude toward said passageway.

20. An apparatus according to claim 1, wherein ion-exchange groups are introduced into said substrate nonwoven fabric by utilizing radiation-initiated graft polymerization.

\* \* \* \* \*

UNITED STATES PATENT AND TRADEMARK OFFICE
CERTIFICATE OF CORRECTION

PATENT NO. : 5,738,775
DATED : April 14, 1998
INVENTOR(S) : Hiroshi Nagai et al.

It is certified that error appears in the above-identified patent and that said Letters Patent is hereby corrected as shown below:

Cover page, item [62], delete "Division" and insert therefor --Continuation--;

under item [30], delete "Oct 1, 1995" and insert therefor --Oct. 4, 1995--.

Signed and Sealed this

Twenty-first Day of July, 1998

Attest:

BRUCE LEHMAN

*Attesting Officer*    *Commissioner of Patents and Trademarks*